C. D. SMELSER.
TRANSMISSION CLUTCH LOCKOUT.
APPLICATION FILED MAR. 13, 1915.

1,170,121.

Patented Feb. 1, 1916.
2 SHEETS—SHEET 1.

WITNESSES:
L. B. Woerner
W. Hurte.

INVENTOR.
Chase D. Smelser.
BY Minturn & Woerner
ATTORNEYS.

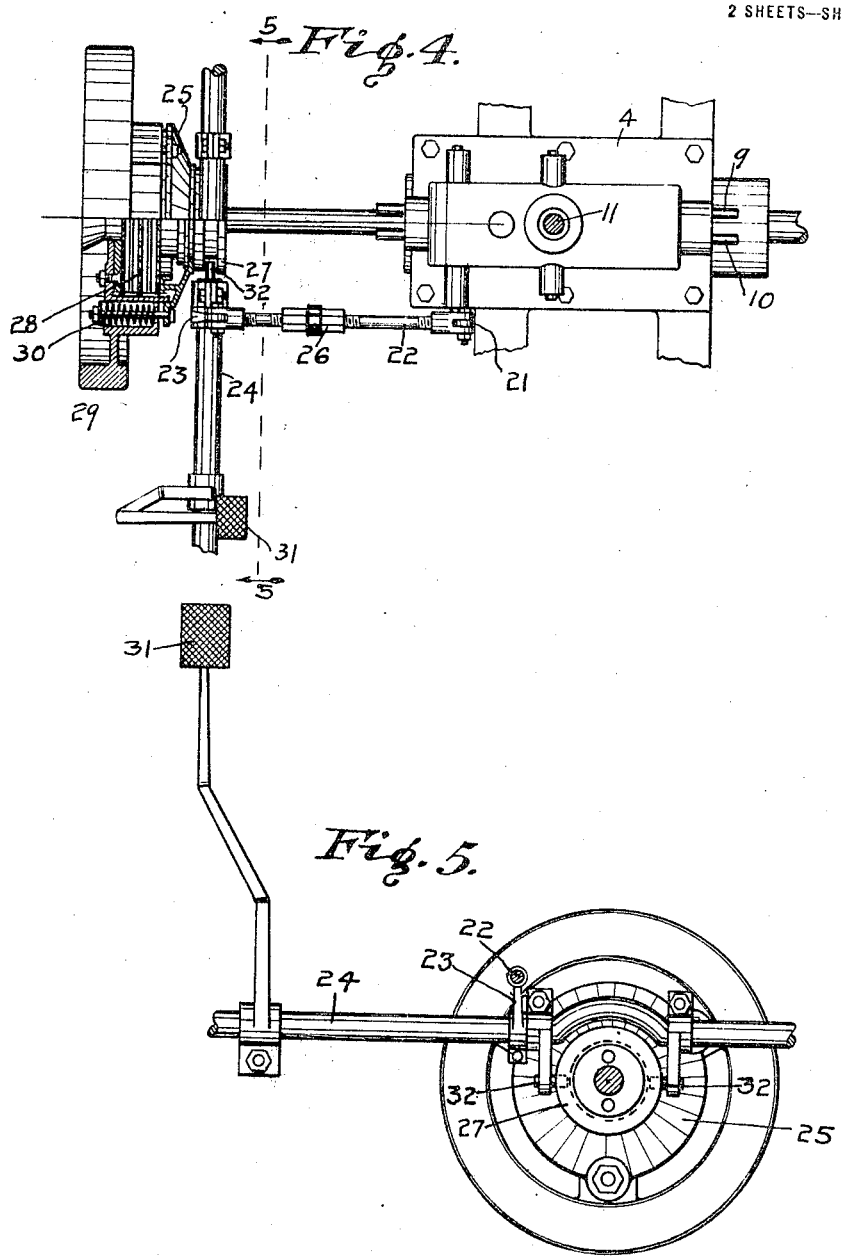

UNITED STATES PATENT OFFICE.

CHASE D. SMELSER, OF RUSHVILLE, INDIANA.

TRANSMISSION-CLUTCH LOCKOUT.

1,170,121.  Specification of Letters Patent.  Patented Feb. 1, 1916.

Application filed March 13, 1915. Serial No. 14,150.

*To all whom it may concern:*

Be it known that I, CHASE D. SMELSER, a citizen of the United States, residing at Rushville, in the county of Rush and State of Indiana, have invented certain new and useful Improvements in Transmission-Clutch Lockouts, of which the following is a specification.

In most motor-car construction of today a change of speed or of direction of travel of the car, as from forward to reverse, involves the shifting of the gears of a transmission, and it is well known that much damage is frequently done to the gear-teeth, mutilating them or shearing them off entirely, by inadvertent or careless efforts to change their driving engagement while the clutch connecting the transmission with the power plant of the machine is engaged.

The object of this invention is to prevent the above injury to the gears by making it impossible to shift the gears of the transmission while the clutch is in engagement by automatically locking them and keeping them locked while the clutch is engaged, and by automatically unlocking them under opposite conditions of the clutch.

The object, also, is to provide a simple and inexpensive mechanism which may be readily adapted by any skilled mechanic in motor-vehicle construction to any of the variously assembled machines.

As it is impracticable to illustrate all of the different motor-car assemblies on the market, I have selected one by way of illustration, only, wherein the power plant is located on the sub-frame, and in which the gear-shifting yokes are fixed on the drag-rods and shift with the latter, and wherein, in the accompanying drawings—

Figure 1:
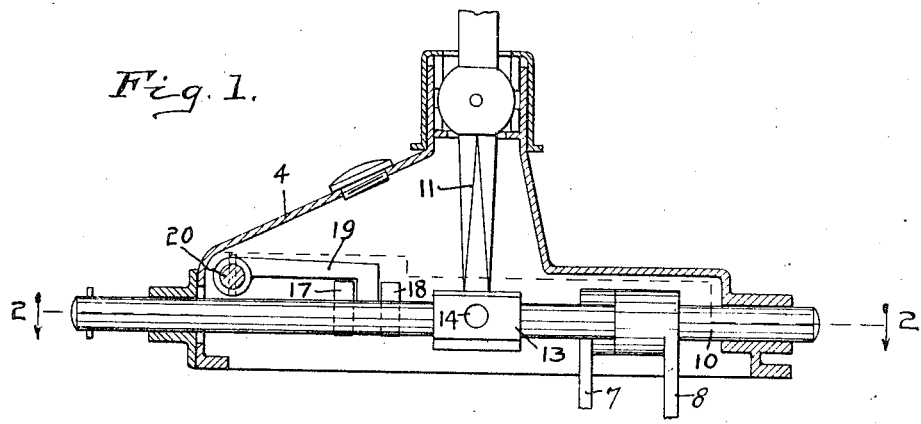
Figure 2:
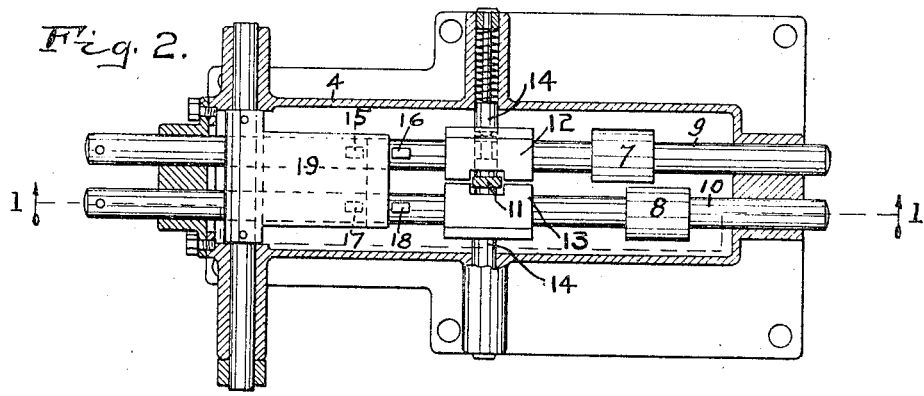
Figure 3:
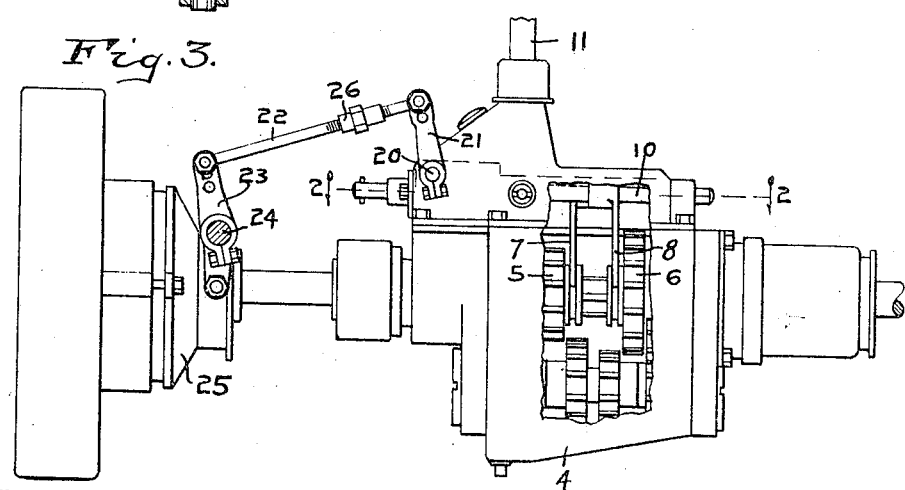

Figure 1 is a vertical detail section on the line 1—1 of Fig. 2, through the upper portion of the transmission showing the parts in position to lock the transmission. Fig. 2 is a horizontal section on the line 2—2 of Figs. 1 and 3. Fig. 3 is a side elevation of the transmission and clutch showing the connection between the clutch shaft and transmission lock and showing the transmission case broken away in part. Fig. 4 is a top plan view and partial horizontal section of the mechanism shown in Fig. 3 and Fig. 5 is a section on the line 5—5 of Fig. 4.

Like characters of reference indicate like parts throughout the several views of the drawings.

The drawings only represent a preferred and not an arbitrary form of my invention, and the particular assembly of the associated parts is only by way of illustration.

Referring to the drawings, 4 is the transmission case, within which slidingly mounted on their respective shafts, are the spur gears 5 and 6, having channeled hubs into which are projected the respective shifting yokes 7 and 8 by which said gears are moved to the right or the left, as the case may be, into engagement with other suitable gears to vary the speed in any usual or approved manner, the details of which form no part of my present invention. The yokes 7 and 8 in the construction here illustrated, are fixed on the respective shafts 9 and 10, and the shafts are longitudinally adjustable to change the positions of their respective yokes, but in some motor cars the yokes are adjustable on fixed shafts. The longitudinal adjustments of the shafts 9 and 10 are made by the engagement of the end of a single swinging lever 11, with notches in a block on the shaft to be moved, as in the block 12 fixed on the shaft 9, or the block 13 on the shaft 10. The given adjustments of the shafts are held by spring-dogs 14 engaging the sides of the blocks. The drawing shows the transmission in neutral position to stop the movement of the car.

Projecting upwardly from the shafts 9 and 10 are lugs 15, 16, 17 and 18, which are engaged by the bent end of a locking plate 19 fixed on a rock-shaft 20, journaled in the upper part of the case 4. The locking-plate is oscillated by rocking the shaft 20, and by engagement of its bent end with the lugs of the shafts 9 and 10 the plate locks the shafts against longitudinal movement. As long as the locking-plate is held out of contact with the shafts the coupling hereinafter described will be disengaged, and the locations of the lugs on their shafts and the widths are such as to hold the locking plate away from shafts 9 and 10 until the gear being shifted has been moved the full distance of its intended shift.

Mounted on the rock-shaft 20, is a crank-arm 21, the outer end of which is connected by a rod 22 with a crank-arm 23 on a clutch-shaft 24. The clutch-shaft 24 and clutch 25 are of any usual and well known construction in which 27 is a grooved collar which receives pins 32 on arms from shaft 24 which shaft is rocked by a foot-pedal 31;

30 are springs to hold friction disks 28 in contact with each other and 29 is a fly-wheel. The connecting rod 22 preferably includes a turn-buckle 26, by which its length may be adjusted, and as an additional adjusting means the arms 21 and 22 have a series of holes near their outer ends for different attachments of the rod 22.

Starting with the shafts 9 and 10 in the positions shown in Fig. 2, they may be each independently moved either to the right or to the left in the direction of their axes a distance slightly greater than the width of the respective lug 15, 16, 17 or 18, by first lifting the bent end of locking plate 19 out of engagement with the lugs. This releases the coupling 25 and the clutch cannot become engaged again until the full operation of the shifting is made, thus bringing the gears into full mesh, where they will be locked by the lowering of the bent end of the plate into contact with the shafts.

I claim:

1. In a transmission clutch lockout, the combination of a gear transmission, gear-shifting yoke-shafts having formations to engage a lock-plate hinged at one end and hooked at the other, a lock-plate to engage the formations on the yoke shaft and hold said yoke-shafts, a clutch between the transmission and its source of power, and means connecting the clutch with the lock-plate to move the latter into position to hold the shafts when the clutch is closed and to release them when it is open.

2. In a transmission clutch lockout, the combination of a gear transmission, gear-shifting yoke-shafts having lateral lugs, a swinging lock-means having an end hook to hold the yoke-shafts by engagement with their lugs, the lugs of each shaft being separated from each other approximately the thickness of the hooks and the dimensions of the lugs and hooks axially of the yoke shafts being substantially the same, a clutch between the transmission and its source of power, a shaft to operate the clutch and means to operate the lock-means by the movement of the clutch shaft.

In witness whereof I have hereunto set my hand and seal at Indianapolis, Indiana, this 11th day of February, A. D. one thousand nine hundred and fifteen.

CHASE D. SMELSER. [L. S.]

Witnesses:
F. W. WOERNER,
J. A. MINTURN.